United States Patent
Tsuchiya et al.

(10) Patent No.: US 9,813,686 B2
(45) Date of Patent: Nov. 7, 2017

(54) IMAGING APPARATUS, AND CONTROL METHOD OF IMAGING APPARATUS

(71) Applicant: OLYMPUS CORPORATION, Hachioji-shi, Tokyo (JP)

(72) Inventors: Hitoshi Tsuchiya, Hamura (JP); Tomoyuki Sato, Yokohama (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/277,428

(22) Filed: Sep. 27, 2016

(65) Prior Publication Data

US 2017/0094239 A1 Mar. 30, 2017

(30) Foreign Application Priority Data

Sep. 29, 2015 (JP) ................................ 2015-192027

(51) Int. Cl.
*H04N 9/31* (2006.01)

(52) U.S. Cl.
CPC ......... *H04N 9/3194* (2013.01); *H04N 9/3185* (2013.01)

(58) Field of Classification Search
CPC ........................ H04N 9/3194; H04N 9/3185
See application file for complete search history.

(56) References Cited

U.S. PATENT DOCUMENTS

| 2013/0027585 A1* | 1/2013 | Souma ............... G02B 15/177 348/240.1 |
| 2015/0070662 A1* | 3/2015 | Nishima ............. H04N 9/3188 353/70 |

FOREIGN PATENT DOCUMENTS

JP 2014-053720 A 3/2014

* cited by examiner

*Primary Examiner* — Michael Teitelbaum
(74) *Attorney, Agent, or Firm* — Volpe and Koenig, P.C.

(57) ABSTRACT

An imaging apparatus according to one embodiment comprises an imaging element, a photographing optical system, an imaging control section, a first projection converting section, composing section, and a second projection converting section. The first projection converting section converts a first projection images into second projection images, respectively, each of which is an image of a second projection system in which a variation of a change amount of an image height on an imaging plane to a change amount of an entrance angle of the light into the photographing optical system is smaller than that of the first projection image. The composing section composes the second projection images to acquire a composed image. The second projection converting section converts the composed image into an image of a projection system different from the second projection system.

20 Claims, 11 Drawing Sheets

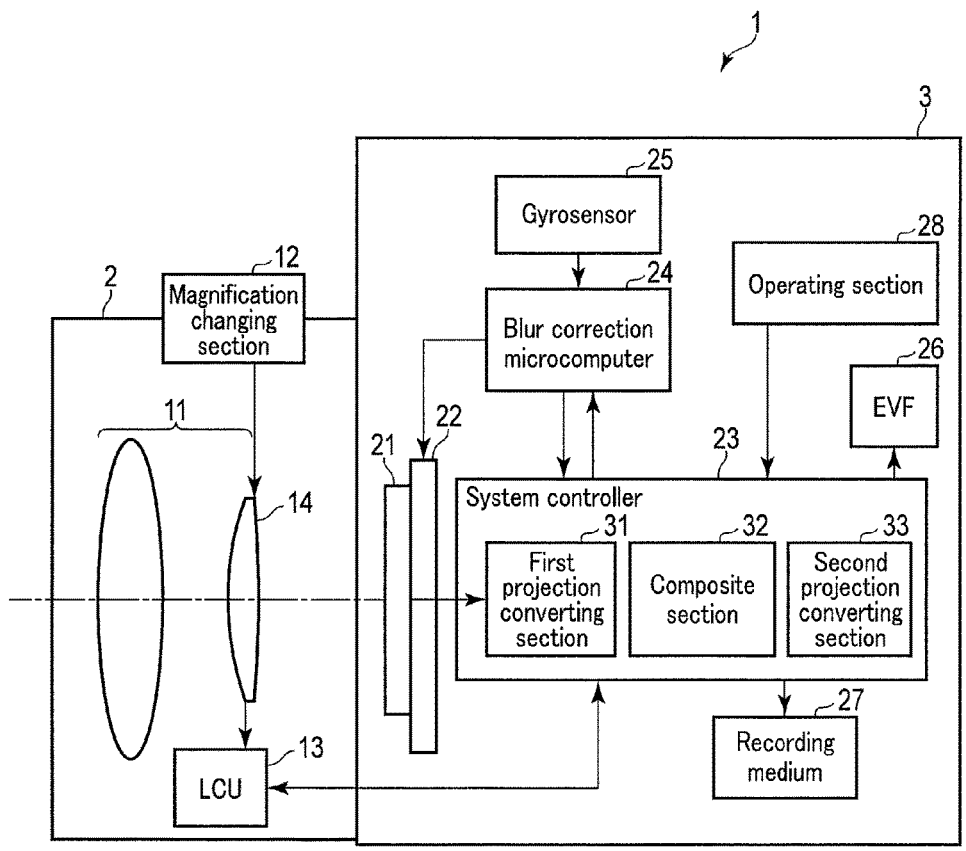
F I G. 1
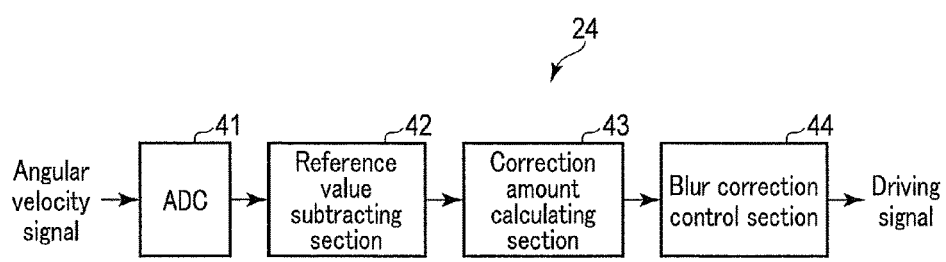
F I G. 2

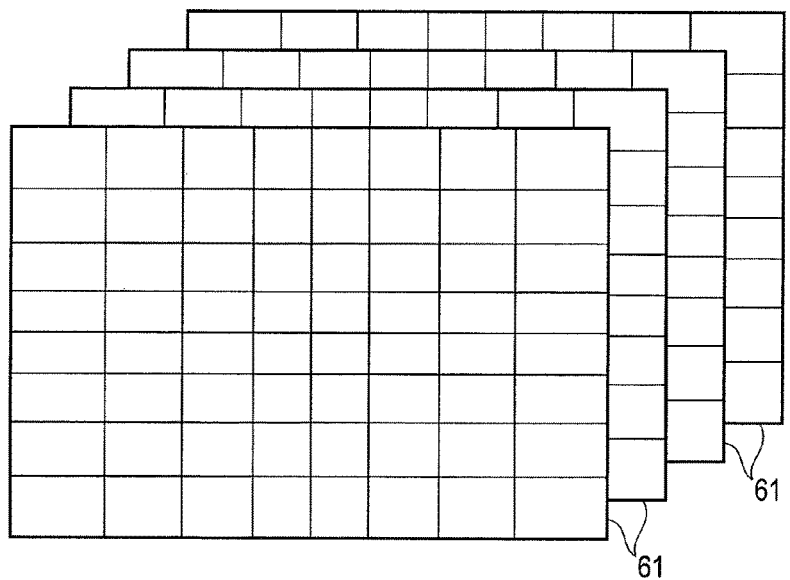
F I G. 7A
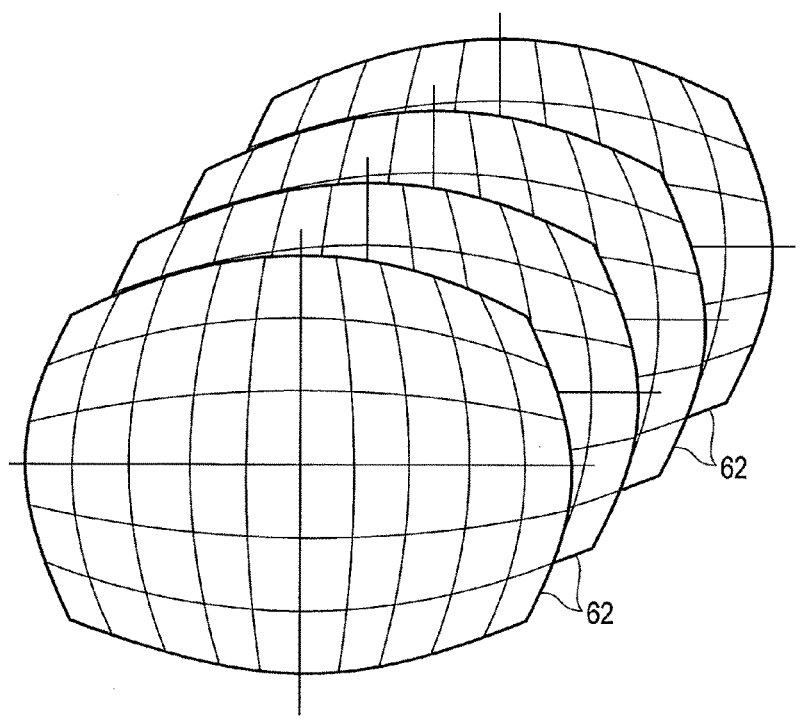
F I G. 7B

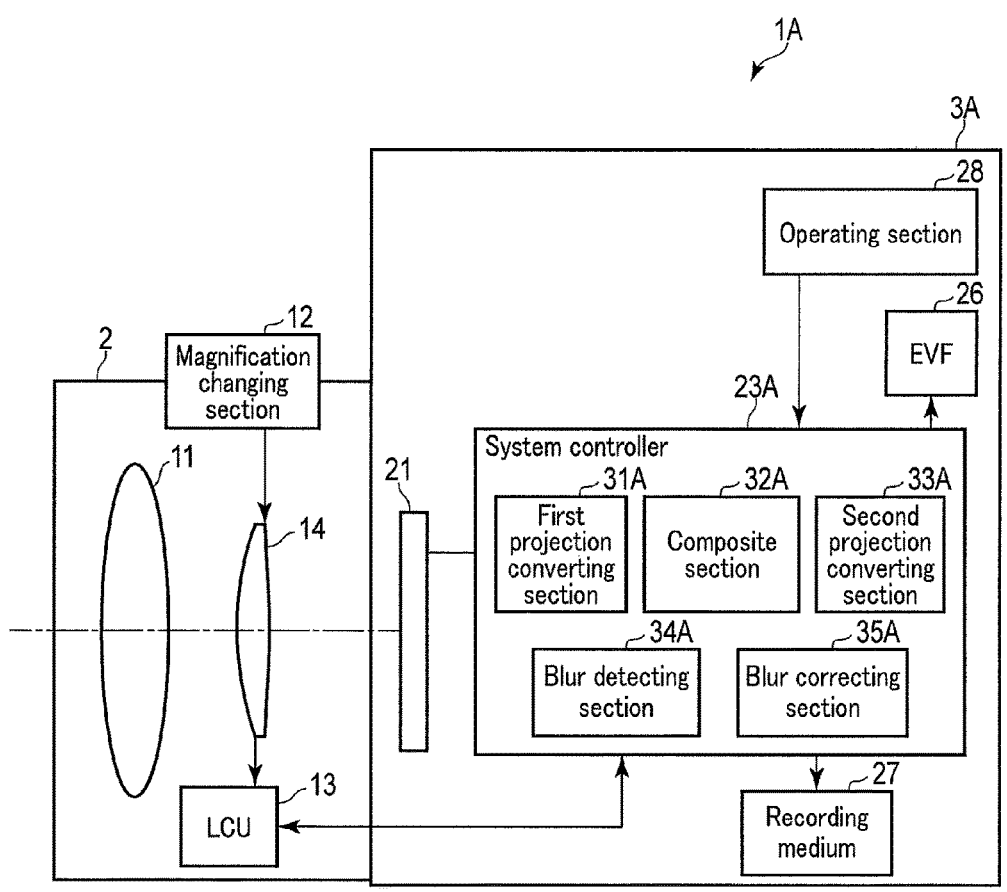
F I G. 8

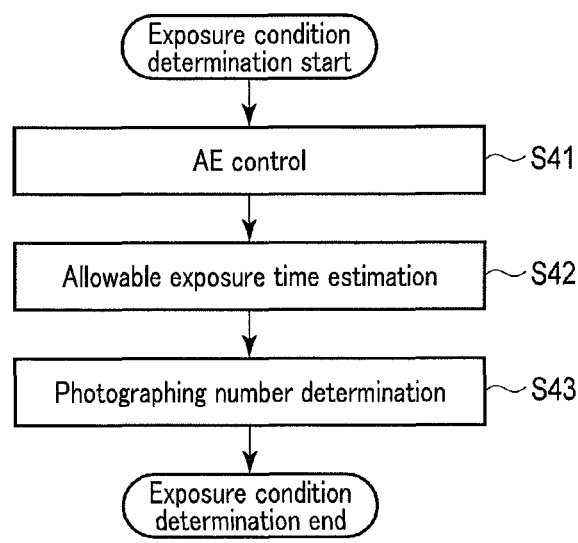
F I G. 10

IMAGING APPARATUS, AND CONTROL METHOD OF IMAGING APPARATUS

CROSS-REFERENCE TO RELATED APPLICATIONS

This application is based upon and claims the benefit of priority from the prior Japanese Patent Application No. 2015-192027, filed Sep. 29, 2015, the entire contents of which are incorporated herein by reference.

FIELD

The present invention relates to an imaging apparatus, and a control method of the imaging apparatus.

BACKGROUND

There has been used practically an imaging apparatus that detects an amount of blur of a subject image (an image moving amount) on an imaging plane which occurs by accompanying posture change of the imaging apparatus and cancels the detected image moving amount. Such an imaging apparatus performs, for example, optical blur correction to correct a positional relation between the imaging plane and the subject image, electronic blur correction to move an effective region on the imaging plane, or the like, whereby the imaging apparatus corrects the image blur that accompanies the posture change of the imaging apparatus.

For example, Jpn. Pat. Appln. KOKAI Publication No. 2014-053720 discloses an imaging apparatus that performs optical blur correction. Examples of the optical blur correction include systems of lens shift type blur correction to correct image blur by an imaging lens comprising a correction optical system constituted to be movable in an image blur canceling direction, image sensor shift type blur correction to correct the image blur by an imaging element comprising an imaging plane constituted to be movable in a direction perpendicular to an optical axis of the imaging lens, and the like. Furthermore, in the electronic blur correction, the imaging apparatus moves, on the imaging plane, the effective region in which it is possible to acquire the image on the imaging plane to correct the image blur.

SUMMARY

An imaging apparatus according to one embodiment comprises an imaging element, a photographing optical system, an imaging control section, a first projection converting section, a composing section, and a second projection converting section. The imaging element comprises an imaging plane in which pixels to convert light into electric signals are arranged. The photographing optical system forms a subject image of a first projection system on the imaging plane. The imaging control section acquires first projection images corresponding to the subject image by the imaging element. The first projection converting section converts the first projection images into second projection images, respectively, each of which is an image of a second projection system in which a variation of a change amount of an image height on the imaging plane to a change amount of an incidence angle of the light into the photographing optical system is smaller than that of the first projection image. The composing section composes the second projection images to acquire a composed image. The second projection converting section converts the composed image into an image of a projection system different from the second projection system.

According to the present invention, there can be provided an imaging apparatus capable of appropriately performing image composition and a control method of the imaging apparatus.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram to explain a constitution example of an imaging apparatus according to a first embodiment;

FIG. 2 is a diagram to explain a constitution example of a blur correction microcomputer of the imaging apparatus according to the first embodiment;

FIG. 7A is an explanatory view to explain image processing of wide-angle slow shutter photographing in the imaging apparatus according to the first embodiment;

FIG. 7B is an explanatory view to explain the image processing of the wide-angle slow shutter photographing in the imaging apparatus according to the first embodiment;

FIG. 8 is a diagram to explain a constitution example of an imaging apparatus according to a second embodiment;

FIG. 10 is a flowchart to explain an example of an operation of determining exposure conditions in the imaging apparatus of the second embodiment.

DETAILED DESCRIPTION

Figure 3:
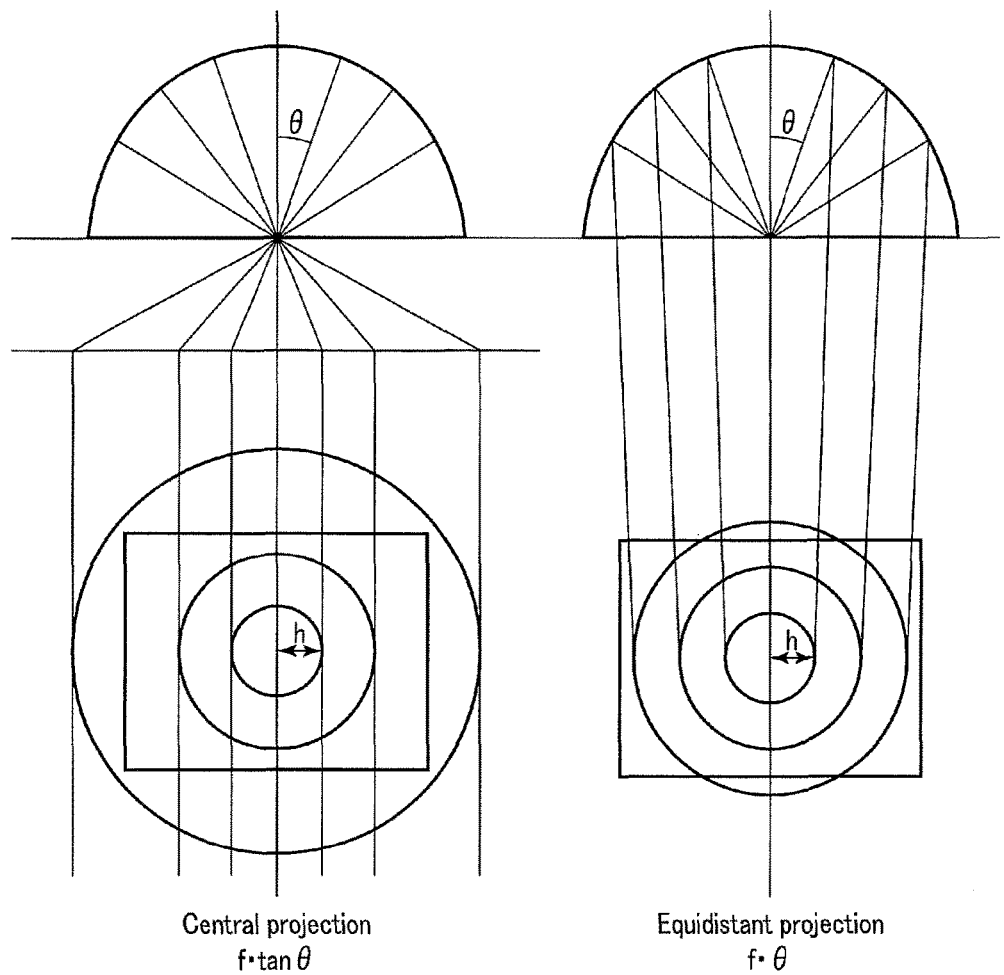
FIG. 3 is a diagram showing a relation between an incidence angle and an image height in an optical system of an equidistant projection system.

Hereinafter, an imaging apparatus according to one embodiment and a control method of the imaging apparatus will be described in detail with reference to the drawings.

First Embodiment

Hereinafter, an example of an imaging apparatus 1 according to a first embodiment will be described with reference to FIG. 1 to FIG. 7. FIG. 1 shows a constitution example of the imaging apparatus 1. The imaging apparatus 1 determines a proper exposure time and composes images acquired by performing continuous photographing for an exposure time that is shorter than the proper exposure time to generate a composed image. Consequently, the imaging apparatus 1 acquires the image of the proper exposure at a shutter speed faster than the proper exposure time, so that it is possible to decrease image blur.

The imaging apparatus 1 is a lens interchangeable type camera that is capable of executing image blur prevention processing of decreasing the image blur by image processing as described above. The imaging apparatus 1 comprises an interchangeable lens 2 and a camera main body 3.

The interchangeable lens 2 is constituted to be attachable to/detachable from the camera main body 3. In a case of attaching the interchangeable lens 2 to the camera main body 3, the interchangeable lens is connected to the camera main body 3 in a mutually communicable state. Consequently, the interchangeable lens 2 and the camera main body 3 cooperate with each other. The interchangeable lens 2 comprises an optical system 11, a magnification changing section 12, and a lens control unit (LCU) 13.

The optical system 11 is an imaging lens of a central projection system. The optical system 11 forms an image of a light flux from an unshown subject on an imaging plane of an imaging element 21 of the camera main body 3. The optical system 11 comprises, for example, lenses, a aperture that adjusts a quantity of the light flux entering the imaging element 21 via the lens, and a lens (a zoom lens) 14 to change a focal distance of the optical system 11. The optical system 11 moves a position of the zoom lens 14 in an optical axis direction of the optical system 11 to change the focal distance (a field angle) of the optical system 11. Furthermore, the optical system 11 may further comprise a focusing lens to change a focusing position. It is to be noted that the optical system 11 may be any lens as long as the lens is an imaging lens of another projection system excluding an equidistant projection system.

The magnification changing section 12 is a mechanism to change the position of the zoom lens 14. The magnification changing section 12 comprises, for example, a zoom ring disposed in an outer periphery of the interchangeable lens 2, and changes the position of the zoom lens 14 in accordance with an operation of the zoom ring, thereby changing the field angle of the optical system 11.

The LCU 13 is, for example, a controller including a CPU, a memory and the like, and controls an operation of the interchangeable lens 2. For example, the LCU 13 controls driving of the lenses and aperture of the optical system 11 in accordance with an instruction from a system controller 23 of the camera main body 3. Furthermore, the LCU 13 may change the field angle of the optical system 11 by changing the position of the zoom lens 14 in accordance with the instruction from the system controller 23.

The LCU 13 holds various pieces of information on the interchangeable lens 2 (optical characteristic information) in the memory. The LOU 13 holds, for example, information indicating a model name of the interchangeable lens 2, the focal distance, the number of zoom positions (the number of the positions where the zoom lens 14 is stoppable), the projection system, present setting of the optical system 11 and the like as the optical characteristic information in the memory. The LCU 13 supplies the optical characteristic information stored in the memory to the camera main body 3 in accordance with the instruction from the system controller 23.

The camera main body 3 comprises the imaging element 21, a blur correcting section 22, the system controller 23, a blur correction microcomputer (the microcomputer) 24, a gyrosensor 25, an electronic view finder (EVF) 26, a recording medium 27, and an operating section 28.

The imaging element 21 comprises the imaging plane constituted by arranging pixels which photoelectrically convert light to accumulate charges. The imaging element 21 is constituted of, for example, a charge coupled devices (CCD) image sensor, a complementary metal oxide semiconductor (CMOS) image sensor or another imaging element. The imaging element 21 converts the subject image formed on the imaging plane by the optical system 11 into an electric signal (an image signal). The imaging element 21 converts the image signal that is an analog electric signal into image data that is a digital signal to output the data.

The blur correcting section 22 moves the imaging plane of the imaging element 21 in a plane perpendicular to an optical axis of the optical system 11 in accordance with a driving signal generated by the blur correction microcomputer 24, thereby correcting the blur of the subject image on the imaging plane which occurs by accompanying the posture change of the imaging apparatus 1.

The system controller 23 is a controller that includes, for example, a CPU, a memory and the like, and controls an operation of the camera main body 3. For example, the system controller 23 reads the image data obtained by the imaging element 21, and subjects the read image data to various types of image processing required for display or recording. Furthermore, the system controller 23 instructs the LCU 13 of the interchangeable lens 2 to drive the aperture for exposure adjustment or to drive the lens for focus adjustment. Furthermore, the system controller 23 executes control of image display in the EVF 26, control of recording of an image file into the recording medium 27, control to switch an operation mode in accordance with an operation of the operating section 28, control of start or end of a photographing operation, and the like.

Furthermore, the system controller 23 acquires the optical characteristic information from the interchangeable lens 2. For example, the system controller 23 acquires the optical characteristic information from the interchangeable lens 2 at a start time and/or periodically, thereby successively recognizing optical characteristics of the interchangeable lens 2. The system controller 23 inputs the acquired optical characteristic information into the blur correction microcomputer 24.

Furthermore, the system controller 23 comprises a first projection converting section 31, a composing section 32, and a second projection converting section 33.

The first projection converting section 31 performs projection conversion to convert the projection system of the image data read from the imaging element 21. The first projection converting section 31 converts a first projection image (a central projection image herein) into a second projection image of a second projection system (an equidistant projection image herein) in which a variation of a change amount of an image height on the imaging plane to a change amount of an incidence angle of light into the optical system 11 is smaller than that of the first projection image. That is, the first projection converting section 31 converts the image data read from the imaging element 21 into the image data of the projection system in which a difference is smaller between the change amount of the image height to the change amount of the incidence angle at an optical axis center and the change amount of the image height to the change amount of the incidence angle at a position away from the optical axis center. Specifically, the first projection converting section 31 converts the image data of the central projection system which is read from the imaging element 21 into the image data of the equidistant projection system.

The composing section 32 composes pieces of image data in which the projection system is converted by the first projection converting section 31, and acquires a composed image. For example, the composing section 32 composes the pieces of image data converted into the equidistant projection system by the first projection converting section 31, and acquires the composed image of the equidistant projection system.

The second projection converting section 33 performs projection conversion to convert the projection system of the composed image composed by the composing section 32. The second projection converting section 33 converts the projection system of the composed image composed by the composing section 32 into the projection system to be recorded in the form of a file. For example, the second projection converting section 33 returns the projection system of the composed image composed by the composing section 32 back to an original projection system. That is, the second projection converting section 33 returns the composed image of the equidistant projection system back to the composed image of the central projection system that is the original projection system. It is to be noted that the second projection converting section 33 may convert the projection system of the composed image composed by the composing section 32 into another projection system that is not the original projection system.

The system controller 23 performs wide-angle slow shutter photographing that is image blur prevention processing by the first projection converting section 31, the composing section 32, and the second projection converting section 33. In the case of performing the wide-angle slow shutter photographing, the system controller 23 recognizes the proper exposure time in which the proper exposure is obtainable on the basis of the exposure result by the imaging element 21, and performs continuous photographing to acquire the pieces of image data continuously for the exposure time that is shorter than the proper exposure time. The first projection converting section 31 of the system controller 23 performs the projection conversion of the projection system of the pieces of image data obtained by the continuous photographing. The system controller 23 composes the pieces of image data subjected to the projection conversion by the first projection converting section 31 to acquire the composed image. The second projection converting section 33 of the system controller 23 performs the projection conversion of the composed image composed by the composing section 32, thereby acquiring the image data of an optional projection system.

The blur correction microcomputer 24 is a microcomputer that executes control concerned with the image blur correction (camera shake correction). The blur correction microcomputer 24 acquires an angular velocity signal from the gyrosensor 25, and acquires the optical characteristic information of the interchangeable lens 2 from the system controller 23. The blur correction microcomputer 24 controls the blur correcting section 22 on the basis of the acquired angular velocity signal and optical characteristic information, thereby correcting the image blur. For example, the blur correction microcomputer 24 calculates a direction of the image blur and an image moving amount of the subject image on the imaging plane on the basis of the acquired angular velocity signal and optical characteristic information. The blur correction microcomputer 24 controls the blur correcting section 22 to move the imaging plane in an image blur canceling direction in accordance with the calculated image blur direction and image moving amount, thereby correcting the image blur. That is, the blur correction microcomputer 24 adjusts a positional relation between the subject image formed on the imaging plane by the optical system 11 and the imaging plane, thereby correcting the image blur.

The gyrosensor 25 detects, as the angular velocity signal, a rotary motion of the camera main body 3 which occurs by accompanying the change of the posture of the camera main body 3. The gyrosensor 25 detects, for example, the rotary motion in a pitch direction in which a horizontal direction of the imaging plane of the imaging element 21 is defined as an axis, and the rotary motion in a yaw direction in which a vertical direction of the imaging plane is defined as an axis, and generates the angular velocity signal. Furthermore, the gyrosensor 25 detects the rotary motion in a roll direction in which the optical axis of the optical system 11 is defined as an axis, and generates the angular velocity signal.

The EVF 26 displays various screens. The EVF 26 comprises a display device such as a liquid crystal display or an organic EL display, and an eyepiece optical system. The EVF 26 displays, in the display device, the screen generated by the system controller 23. Consequently, the EVF 26 can display, in the display device, an image obtained by the imaging element 21, a menu screen for setting, and the like. It is to be noted that the EVF 26 may be constituted of the display device disposed in a finder eyepiece portion as described above, or may be constituted of a display panel disposed in the camera main body 3.

The recording medium 27 is a recording medium that records the image file. The recording medium 27 is, for example, a memory card.

The operating section 28 comprises operation members to be operated by a user. For example, the operating section 28 comprises a release button, a moving image recording button, and the like as the operation members. The release button is a button to execute static image photographing processing by the camera main body 3. Furthermore, the moving image recording button is a button that operates the camera main body 3 to execute moving image recording processing. Furthermore, the operating section 28 may comprise, as the operation member, a button to change the operation mode of the camera main body 3 or various setting of exposure control and the like. For example, the operating section 28 may comprise, as the operation member, a button to change setting of performing/non-performing of the image composition by the first projection converting section 31, the composing section 32 and the second projection converting section 33.

Next, details of the blur correction microcomputer 24 will be described. FIG. 2 is a diagram showing an example of a constitution of the blur correction microcomputer 24. As shown in FIG. 2, the blur correction microcomputer 24 comprises an analog/digital converter (ADC) 41, a reference value subtracting section 42, a correction amount calculating section 43, and a blur correction control section 44. According to the constitution shown in FIG. 2, it is possible to control the image blur correction of one direction in the imaging plane. That is, the blur correction microcomputer 24 comprises the constitution shown in FIG. 2 every direction to perform the image blur correction, so that it is possible to control the image blur correction in directions. Here, to simplify the description, the control of the image blur correction in the one direction by the blur correction microcomputer 24 will be described.

The ADC 41 converts an analog angular velocity signal output from the gyrosensor 25 into the digital signal, and outputs a digital angular velocity.

The reference value subtracting section 42 subtracts a reference value from a value of the angular velocity signal output from the ADC 41. The reference value is the value of the angular velocity signal when the camera main body 3 is in a stationary state. The reference value subtracting section 42 subtracts the reference value from the output of the ADC 41, thereby outputting a value of the angular velocity having a sign. At this time, the sign of the value of the angular velocity indicates a rotating direction.

The correction amount calculating section 43 calculates the image moving amount that is an amount of the blur of the subject image on the imaging plane which occurs by accompanying the posture change of the camera main body 3, and a direction of the image blur on the basis of the optical characteristic information of the optical system 11 which is supplied from the system controller 23 and the value of the angular velocity output from the reference value subtracting section 42. For example, the correction amount calculating section 43 recognizes a diagonal field angle (the focal distance) and the projection system on the basis of the optical characteristic information of the optical system 11 which is supplied from the system controller 23. The correction amount calculating section 43 calculates the image moving amount and the direction of the image blur of the subject image on the imaging plane in accordance with change of the incidence angle on the basis of the diagonal field angle and the projection system, and outputs the calculated image moving amount and image blur direction as a correction amount.

FIG. 3 is a diagram showing a relation between the incidence angle when the light enters the optical system of such central projection system and equidistant projection system as described above and the image height (a position from the optical axis center herein). It is to be noted that the optical axis center herein is a position of the imaging element 21 on the imaging plane which crosses the optical axis of the optical system.

The central projection system is, for example, a usual imaging lens. In the lens of the central projection system, for example, in a case where the focal distance of the optical system is f, a relation of h=f·tan θ is established among an image height h and the focal distance f and an incidence angle θ. Therefore, in the central projection system, the change amount of the image height to the change amount of the incidence angle at the position away from the optical axis center is larger than the change amount of the image height to the change amount of the incidence angle at the optical axis center. The correction amount calculating section 43 calculates a change amount Δθ of the incidence angle on the basis of the angular velocity output from the reference value subtracting section 42. Furthermore, when defining the image moving amount that accompanies the change of the incidence angle as Δh, the correction amount calculating section 43 calculates the image moving amount Δh on the basis of Δh=f·tan Δθ.

The equidistant projection system is for use in an optical system called, for example, a so-called fisheye lens. In the lens of the equidistant projection system, the incidence angle θ is proportional to the image height h. For example, in a case of defining the focal distance of the optical system 11 as f, a relation of h=f·θ is established among the image height h and the focal distance f and the incidence angle θ. Consequently, in the equidistant projection system, the change amount of the image height to the change amount of the incidence angle at the optical axis center is the same as the change amount of the image height to the change amount of the incidence angle at the position away from the optical axis center. That is, in the equidistant projection system, the difference between the change amount of the image height to the change amount of the incidence angle at the optical axis center and the change amount of the image height to the change amount of the incidence angle at the position distant from the optical axis center is smaller than that of the central projection system. The correction amount calculating section 43 calculates a change amount Δθ of the incidence angle on the basis of the angular velocity output from the reference value subtracting section 42. Furthermore, when defining the image moving amount that accompanies the change of the incidence angle as Δh, the correction amount calculating section 43 calculates the image moving amount Δh on the basis of Δh=f·Δθ.

The blur correction control section 44 controls the blur correcting section 22 in accordance with the correction amount output from the correction amount calculating section 43. The blur correction control section 44 generates the driving signal that operates the blur correcting section 22 to cancel the blur of the subject image, on the basis of the image moving amount and the image blur direction which are indicated by the correction amount output from the correction amount calculating section 43. The blur correction control section 44 inputs the driving signal into the blur correcting section 22 to control the image blur correction in the blur correcting section 22. The driving signal is a signal including a driving pulse to drive a motor disposed in the blur correcting section 22 or information such as a target driving position of the image blur correction by the blur correcting section 22.

Hereinafter, imaging processing in the present embodiment will be described with reference to FIG. 4 to FIG. 7.

Figure 4:
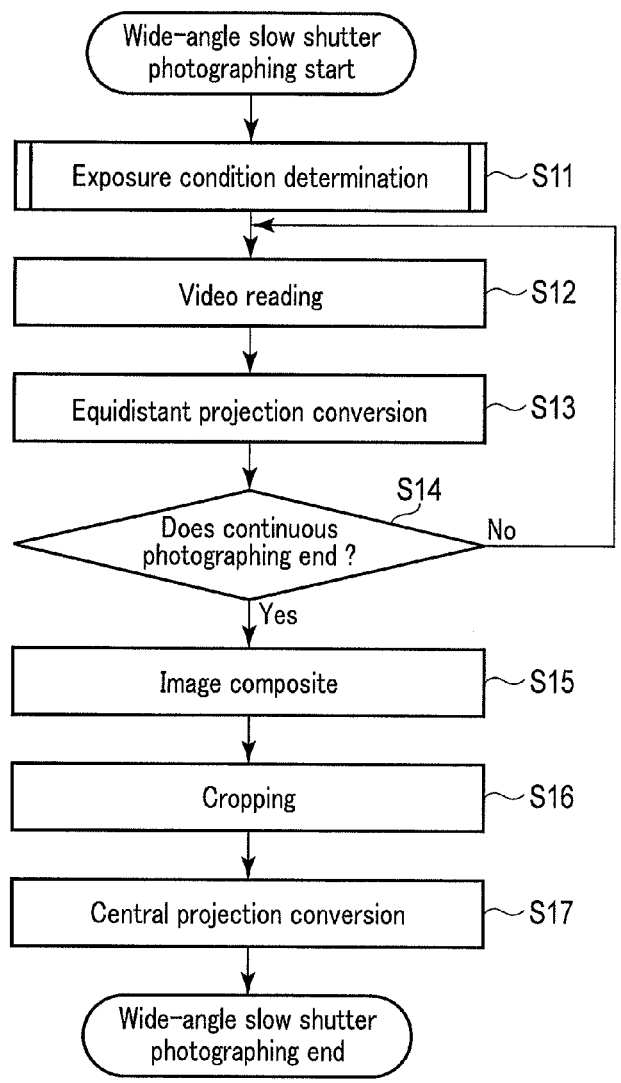
FIG. 4 is a flowchart to explain an example of an operation of the imaging apparatus according to the first embodiment.
Figure 5:
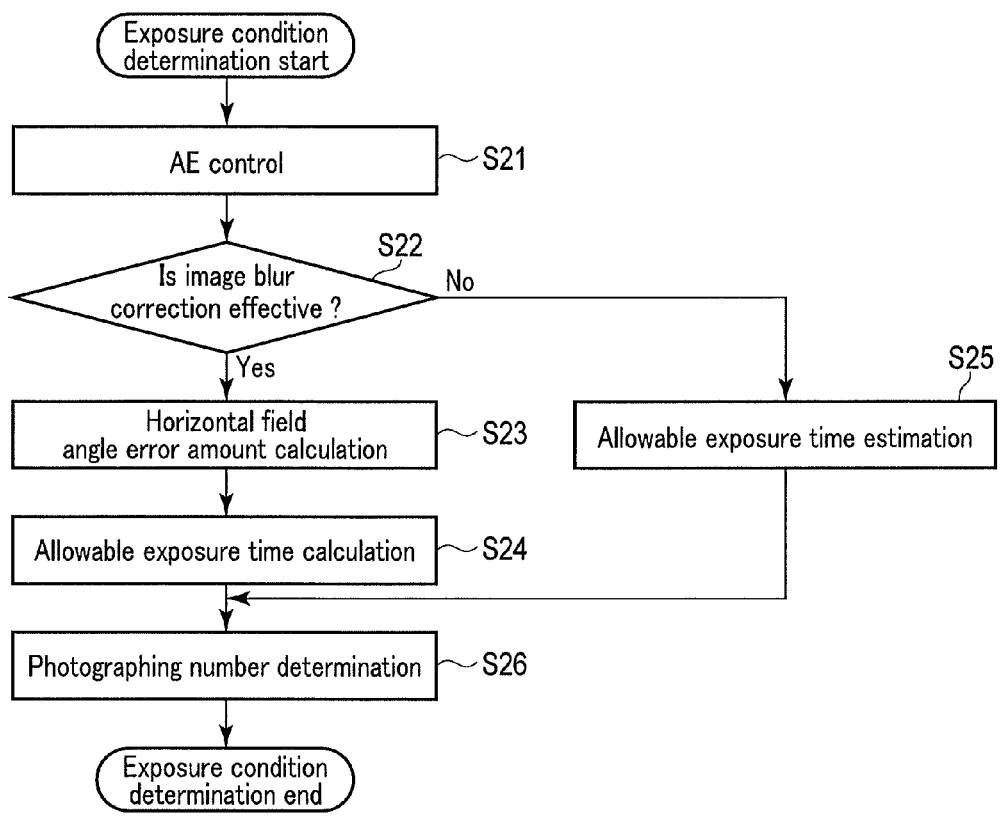
FIG. 5 is a flowchart to explain an example of an operation of determining exposure conditions in the imaging apparatus according to the first embodiment.
Figure 6A:
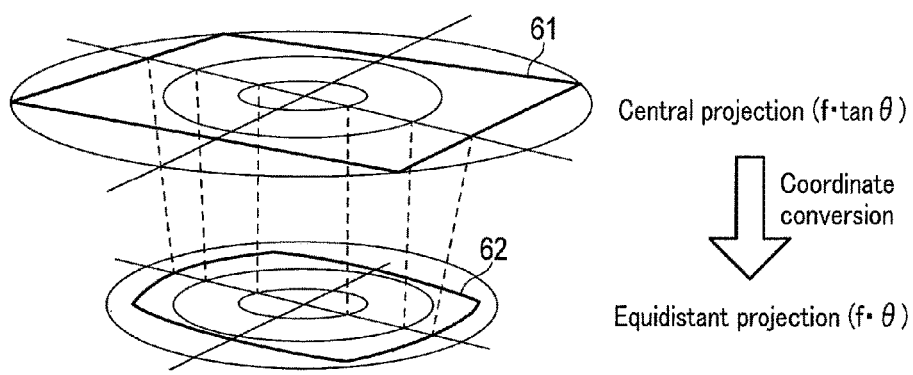
FIG. 6A is an explanatory view schematically showing an example to convert an image from central projection into equidistant projection.
Figure 6B:
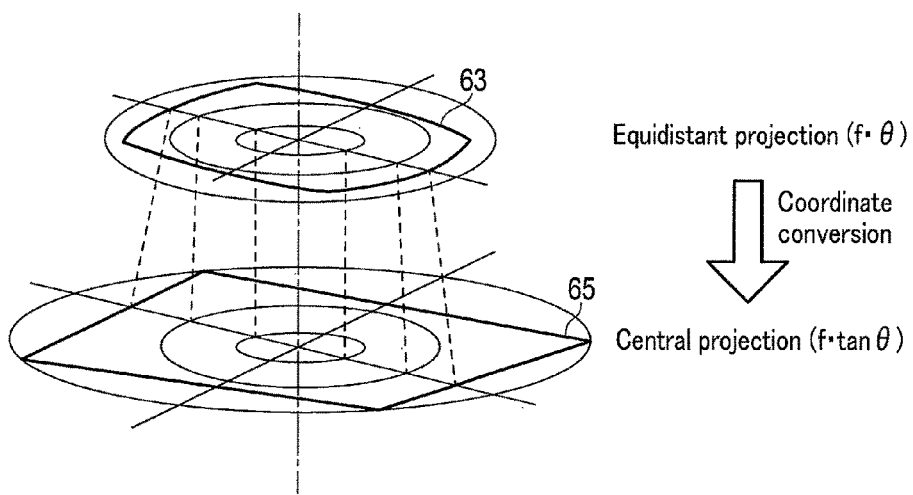
FIG. 6B is an explanatory view schematically showing an example to convert the image from the equidistant projection to the central projection.

FIG. 4 is a flowchart showing an operation of the imaging apparatus 1 that performs the wide-angle slow shutter photographing. FIG. 5 is a flowchart showing the operation of the imaging apparatus 1 that performs exposure condition determination processing. FIG. 6A is an explanatory view schematically showing an example to convert the image from the central projection to the equidistant projection. FIG. 6B is an explanatory view schematically showing an example to convert the image from the equidistant projection to the central projection. FIG. 7A, FIG. 7B, FIG. 7C and FIG. 7D are explanatory views to explain the image processing in the wide-angle slow shutter photographing.

The system controller 23 of the camera main body 3 executes the wide-angle slow shutter photographing in a case where predetermined conditions are satisfied. For example, the system controller 23 executes the wide-angle slow shutter photographing shown in FIG. 4 in a case where the focal distance of the optical system 11 is a wide angle (e.g., smaller than a predetermined focal distance). It is to be noted that FIG. 4 shows an operation concerned with the wide-angle slow shutter photographing. However, the system controller executes control concerned with camera shake correction, exposure control of the imaging element 21 and the like in parallel.

In a case of executing the wide-angle slow shutter photographing, the system controller 23 of the camera main body 3 executes control such as control of automatic focusing by the interchangeable lens 2 or the exposure control by the imaging element 21, thereby executing exposure by the imaging element 21. The system controller 23 determines exposure conditions such as the exposure time and the number of the images to be continuously photographed on the basis of the result of the exposure by the imaging element 21 (step S11).

The system controller 23 first calculates the exposure time (the proper exposure time) for which the proper exposure is obtainable, on the basis of the result of the exposure by the imaging element 21. Furthermore, the system controller 23 calculates the exposure time (an allowable exposure time) for which it is possible to inhibit the image blur. The system controller 23 calculates the number of the images to be composed for the purpose of obtaining the proper exposure when composing the images which are obtainable in a case of performing the exposure for the allowable exposure time. The system controller 23 determines the number of the images to be continuously photographed to acquire the number of the images to be composed.

When completing the exposure in the imaging element 21, the system controller 23 reads video (step S12). As described above, in a case where the optical system 11 is a lens constituted of the central projection system, the system controller 23 acquires image data 61 of the central projection system from the imaging element 21.

The first projection converting section 31 of the system controller 23 converts the image data 61 of the central projection system acquired in the step S12 into image data 62 of the equidistant projection system (step S13). That is, the first projection converting section 31 converts the image data 61 of the central projection system into that of the equidistant projection system.

As shown in FIG. 6A, according to the central projection system, the relation of $h=f \cdot \tan \theta$ is established among the image height h and the focal distance f and the incidence angle $\theta$. Furthermore, according to the equidistant projection system, the relation of $h=f \cdot \theta$ is established among the image height h and the focal distance f and the incidence angle $\theta$. In a case of converting the image data 61 of the central projection system into the image data 62 of the equidistant projection system, the first projection converting section 31 recognizes the incidence angle $\theta$ corresponding to each image point of the image data 61 of the central projection system on the basis of the optical characteristic information acquired by the system controller 23. For example, the first projection converting section 31 recognizes the focal distance of the optical system 11 in accordance with the zoom position indicated by the optical characteristic information. The first projection converting section 31 recognizes the incidence angle $\theta$ corresponding to each image point in accordance with the focal distance of the optical system 11.

The first projection converting section 31 calculates the incidence angle $\theta$ corresponding to each image point from the diagonal field angle of the image data 61 which is determined in accordance with the focal distance. That is, the first projection converting section 31 acquires the diagonal field angle on the basis of the optical characteristic information of the optical system 11, and calculates the incidence angle $\theta$ corresponding to each image point on the basis of the acquired diagonal field angle.

In the case of performing the equidistant projection conversion, the first projection converting section 31 converts a coordinate of each image point based on a position of the optical axis center of the optical system 11 on the image data 61. For example, as shown in FIG. 6A, the first projection converting section 31 performs the coordinate conversion of each image point that is present at the position of $h=f \cdot \tan \theta$ in the image data 61 of the central projection system into that at the position of $f \cdot \theta$, thereby converting the image data 61 of the central projection system into the image data 62 of the equidistant projection system.

It is to be noted that the first projection converting section 31 does not convert the image data 61 of the central projection system into the image data 62 of the equidistant projection system, but may convert the image data 61 of the central projection system into the image data of another projection system.

The system controller 23 judges whether or not the continuous photographing ends (step S14). For example, the system controller 23 judges whether or not the continuous photographing is performed as much as the number of the images to be continuously photographed which is determined in the step S11. In a case of judging that the continuous photographing does not end (the step S14, NO), the system controller 23 shifts to the processing of the step S12. Consequently, the system controller 23 repeats the processing of the steps S12 to S14 until the controller performs the continuous photographing as much as the number of the images to be continuously photographed which is determined in the step S11.

The system controller 23 repeatedly executes the above processing of the step S12 to the step S14, thereby acquiring the pieces of image data 61 of the central projection as shown in FIG. 7A. Furthermore, the system controller 23 converts each piece of image data 61 of the central projection into that of the equidistant projection, thereby acquiring the pieces of image data 62 of the equidistant projection as shown in FIG. 7B.

In a case of judging in the step S14 that the continuous photographing ends (the step S14, YES), the composing section 32 of the system controller 23 composes the images to acquire a composed image 63 (step S15). The system controller 23 composes the pieces of image data 62 of the equidistant projection which are converted in the step S13 to acquire one composed image 63 shown in FIG. 7C. The system controller 23 performs positioning by using an image composition technology such as pattern matching between the pieces of image data 62 to compose the image. Specifically, the system controller 23 adds and composes the pieces of positioned image data 62, thereby acquiring the composed image 63 of the equidistant projection.

Furthermore, the composing section 32 of the system controller 23 crops the composed image 63 (step S16). For example, the system controller 23 sets a region on which all of the pieces of image data 62 are superimposed as a segmented region 64 on the composed image 63, and crop the set segmented region 64. Furthermore, the segmented region 64 may be preset. The segmented region 64 may be set to any region as long as its center is superimposed on the optical axis of the optical system 11.

The second projection converting section 33 of the system controller 23 converts the composed image 63 of the equidistant projection system which is cropped in the step S16 into image data 65 of the central projection system (step S17), to end the wide-angle slow shutter photographing.

Figure 7C:
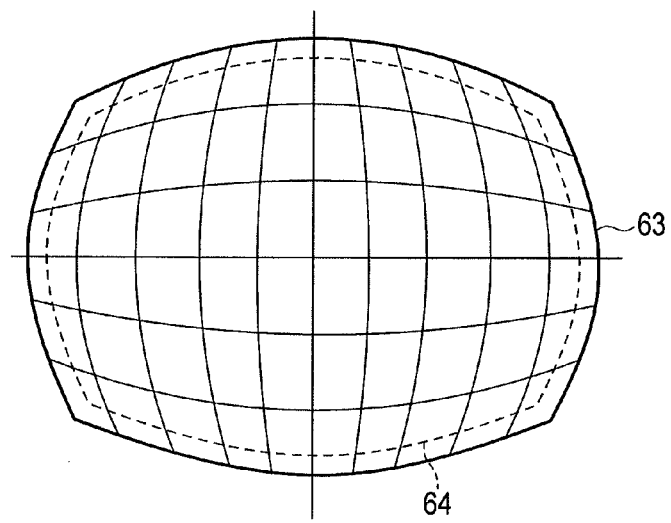
FIG. 7C is an explanatory view to explain the image processing of the wide-angle slow shutter photographing in the imaging apparatus according to the first embodiment.
Figure 7D:
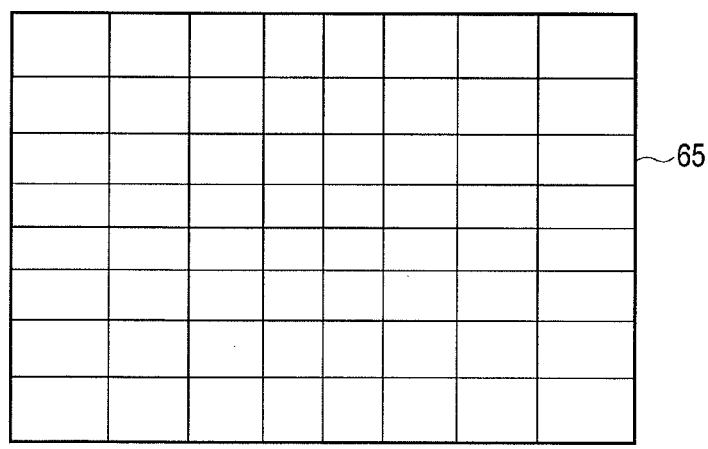
FIG. 7D is an explanatory view to explain the image processing of the wide-angle slow shutter photographing in the imaging apparatus according to the first embodiment.

That is, as shown in FIG. 7D, the second projection converting section 33 converts the composed image 63 of the equidistant projection system into its original central projection system, so that it is possible to obtain the image data 65 of the proper exposure in the exposure time that is shorter than the proper exposure time.

In the case of converting the composed image 63 of the equidistant projection system into the image data 65 of the central projection system, the second projection converting section 33 recognizes the incidence angle θ corresponding to each image point of the composed image 63 of the equidistant projection system. The second projection converting section 33 converts the coordinate of each image point based on the position of the optical axis center of the optical system 11 on the composed image 63. For example, as shown in FIG. 6B, the second projection converting section 33 converts the coordinate of each image point that is present at the position of h=f·θ in the composed image 63 of the equidistant projection system into that at the position of f·tan θ, thereby converting the composed image 63 of the equidistant projection system into the image data 65 of the central projection system.

The system controller 23 converts the image data 65 obtained by the above processing into an image format for recording, thereby generating the image file for recording. The system controller 23 records the image file in the recording medium 27.

Next, the exposure condition determination processing will be described with reference to FIG. 5. First, the system controller 23 determines photo sensitivity of the imaging element 21, exposure time and aperture value to obtain the proper exposure by AE control (step S21). The system controller 23 determines the photo sensitivity of the imaging element 21, exposure time and aperture value on the basis of the result of the exposure by the imaging element 21. That is, the system controller 23 acquires, from the imaging element 21, the result of the exposure by the imaging element 21 as a reference image for the exposure condition determination processing, and determines the photo sensitivity, exposure time and aperture value on the basis of the reference image. The exposure conditions differ depending on whether or not the camera shake correction is effective.

Additionally, in a case where one or more of the photo sensitivity, exposure time and aperture value of the imaging element 21 is designated by a manual operation, the system controller 23 makes determination in accordance with the designated value. For example, in a case where the exposure time is designated, the system controller 23 determines the photo sensitivity and aperture value corresponding to the designated exposure time. Furthermore, in a case where the aperture value is designated, the system controller 23 determines the photo sensitivity and exposure time corresponding to the designated aperture value.

The system controller 23 judges whether or not the camera shake correction is effective (step S22). That is, the system controller 23 judges whether or not the setting is made to perform the image blur correction by the blur correction microcomputer 24 and the blur correcting section 22.

In a case of judging in the step S22 that the camera shake correction is effective (step S22, YES), the system controller 23 calculates a horizontal field angle error amount (step S23). The horizontal field angle error amount is a difference between the image moving amount at a center of the field angle and the image moving amount in a periphery (e.g., an edge portion) of the field angle in the horizontal direction. The system controller 23 calculates the horizontal field angle error amount at the image point of the incidence angle θ on the basis of, for example, f tan(θ+Δθ)−f tan Δθ in which f is the focal distance of the optical system 11 and Δθ is a blur amount of the entrance angle. For example, the system controller 23 calculates the horizontal field angle error amount from the reference image. This difference is a blur remainder of the blur correction by the blur correcting section 22 which is caused by the fact that the image moving amount corresponding to the blur amount of the subject image formed by the optical system 11 of the central projection system is different between the center of the field angle and the periphery of the field angle.

The system controller 23 calculates the allowable exposure time on the basis of the horizontal field angle error amount, the focal distance of the optical system 11, and a reference blur amount (step S24). The allowable exposure time is the exposure time for which the horizontal field angle error amount is not more than the reference blur amount. The reference blur amount is, for example, a standard blur amount at a handheld photographing time, and may be, for example, 1 pixel or less or the number of the pixels which corresponds to a photographing mode. For example, the system controller 23 recognizes the exposure time of the reference image for use in comparison in the step S23, and recognizes the blur amount corresponding to the exposure time. The system controller 23 performs inverse calculation of the blur amount corresponding to the exposure time, thereby calculating the exposure time for which the blur amount is not more than the reference blur amount, as the allowable exposure time.

Furthermore, in a case of judging in the step S22 that the camera shake correction is not effective (step S22, NO), the system controller 23 estimates the allowable exposure time on the basis of the focal distance of the optical system 11 (step S25). It is usually considered that the camera shake does not occur when the exposure time is shorter than 1/f in which f is a 35 mm equivalent focal distance. For example, the system controller 23 estimates an allowable exposure time 1/f on the basis of the focal distance of the optical system 11. Furthermore, for example, the system controller 23 may estimate an allowable exposure time 1/(2·f) on the basis of the focal distance of the optical system 11. At least the system controller 23 may have any constitution as long as the controller estimates the allowable exposure time on the basis of the focal distance of the optical system 11.

When the system controller 23 calculates or estimates the allowable exposure time, the controller determines the number of the images to be photographed (step S26). For example, the system controller 23 judges how many images acquired in the allowable exposure time are to be composed to obtain the proper exposure. For example, in a case where a composition technique is addition composition, the system controller 23 determines, as the number of the images to be photographed, a value obtained by dividing the proper exposure time by the allowable exposure time. Additionally, in a case where the proper exposure time is not divisible by the allowable exposure time, the system controller 23 rounds up to the nearest whole number to decrease the exposure of the image by the image processing, or rounds down to the nearest whole number to increase the exposure of the image by the image processing.

By the above-mentioned processing of the steps S21 to S26, the system controller 23 determines exposure conditions such as the exposure time and the number of the images to be continuously photographed.

As described above, in a case of composing the images, the imaging apparatus 1 converts the acquired image data of a first projection system into the image data of a second projection system in which the difference is smaller between the change amount of the image height to the change amount of the entrance angle at the optical axis center and the change amount of the image height to the change amount of the entrance angle at the position away from the optical axis center. The imaging apparatus 1 positions and composes the pieces of image data of the second projection system to generate a composed image of the second projection system, and converts the composed image into the image data of the first projection system or another projection system. Consequently, even in a case of using the optical system in the system other than the equidistant projection system, it is possible to decrease a difference of the position of the subject image which occurs in a case of positioning the pieces of image data. As a result, the imaging apparatus 1 can appropriately composes the images.

Additionally, in a case of performing the continuous photographing while performing the blur correction by the blur correcting section 22, there is the possibility that the imaging plane moves at an imaging time of the previous image. Consequently, a center of the imaging plane might not match the optical axis center of the optical system 11 at the start of the exposure. Consequently, the first projection converting section 31 performs optical axis center conversion to convert the position of the optical axis center of the optical system 11 on the image data 61 of the central projection system into the center of the field angle of the image data 61, before converting the image data 61 of the central projection system into the image data 62 of the equidistant projection system. In this case, the first projection converting section 31 includes an optical axis center converting function.

The first projection converting section 31 calculates a moving amount of the imaging plane by blur correction of a sensor shift system, thereby calculating a moving position of the optical axis center of the optical system 11. In the blur correction of the sensor shift system, the controller moves the imaging plane to cancel the movement of the image which occurs due to angle change that accompanies the camera shake. Consequently, the position of the optical axis center of the optical system 11 on the imaging plane moves in accordance with the movement of the imaging plane. The first projection converting section 31 calculates the position of the optical axis center of the optical system 11 on the image data 61 on the basis of the moving amount of the imaging plane at the imaging time of each piece of image data 61.

The first projection converting section 31 performs the optical axis center conversion to convert the image data 61 in which the center of the field angle shifts from the center of the optical axis of the optical system 11 into the image data 61 in which the center of the field angle matches the center of the optical axis of the optical system 11.

For example, an angle shift in an X-direction (the horizontal direction) on the imaging plane is defined as θx, an angle shift in a Y-direction (the vertical direction) is defined as θy, and a center of the image data 61 is defined as (0, 0). Here, in a case where an angle change Δθx occurs in the horizontal direction and an angle change Δθy occurs in the vertical direction, the center of the optical axis of the optical system 11 moves to (Δθx, Δθy) in the field angle.

The first projection converting section 31 performs the coordinate conversion so that the center of the optical axis of the optical system 11 becomes a center of the image segmented in a photographing viewing field. For example, the first projection converting section 31 converts the center of the optical axis of the optical system 11 into the center of the image in the X-direction and the Y-direction. In this case, the first projection converting section 31 defines an image point (Δθx, Δθy) as the optical axis center (0, 0), and moves an image point of a coordinate (f·tan θx, f·tan θy) to a coordinate (f·tan(θx−Δθx), f·tan (θy−Δθy)).

By the above processing, the first projection converting section 31 converts the image in which the center of the field angle shifts from the center of the optical axis of the optical system 11 into the image in which the center of the field angle matches the center of the optical axis of the optical system 11. It is to be noted that the optical axis center conversion by the first projection converting section 31 is not limited to the above-mentioned method. The first projection converting section 31 may perform the optical axis center conversion by any method.

Furthermore, the first projection converting section 31 does not perform the optical axis center conversion to the first image data 61, but the composing section 32 may perform the optical axis center conversion to the second image data 62 prior to image composition. In this case, the composing section 32 includes an optical axis center converting function.

According to such a constitution, in a case where the imaging plane of the imaging element 21 has already shifted at the start of the exposure, the system controller 23 of the imaging apparatus 1 specifies a coordinate superimposed on the optical axis center of the optical system 11 in the obtained image data, and performs the optical axis center conversion to convert the specified coordinate into the center of the field angle of the image data, thereby converting the image data of the central projection system into the image data of the equidistant projection system. Consequently, the imaging apparatus 1 can appropriately perform the image composition even in the case where the imaging plane of the imaging element 21 has already shifted at the start of the exposure.

Furthermore, as described above, the imaging apparatus uses inhibition of the blur due to the continuous photographing together with inhibition of the blur due to the shift of the imaging plane, so that it is possible to decrease loads of the image composition and to improve accuracy of the image composition.

It is to be noted that the first projection converting section 31 executes the processing of the step S13 or the second projection converting section 33 executes the processing of the step S18, thereby causing the possibility that the image data elongates. Consequently, the first projection converting section 31 and the second projection converting section 33 may adjust sharpness of the elongated image data or may correct deterioration of the image which accompanies the elongation by a known technique such as resampling.

Additionally, in the above example, it has been described that the imaging apparatus 1 shifts the imaging plane of the imaging element 21 by the blur correcting section 22 to perform the image blur correction, but the present invention is not limited to this constitution. The present invention is applicable even to a constitution of a lens shift system in which, in a case where the interchangeable lens 2 comprising a correction optical system is attached to the camera main body 3, the imaging apparatus 1 drives the correction optical system to move the position of the subject image on the imaging plane, thereby correcting the image blur.

Second Embodiment

Hereinafter, an example of an imaging apparatus 1A according to a second embodiment will be described with reference to FIG. 8 to FIG. 10. It is to be noted that a constitution similar to the imaging apparatus 1 according to the first embodiment is denoted with the same reference signs, and its detailed description is omitted.

FIG. 8 shows the constitution example of the imaging apparatus 1A. The imaging apparatus 1A is a lens interchangeable type camera that performs electronic blur correction. The imaging apparatus 1A comprises a lens 2 and a camera main body 3A. The camera main body 3A comprises an imaging element 21, a system controller 23A, an EVF 26, a recording medium 27, and an operating section 28. That is, the camera main body 3A does not comprise a blur correcting section 22, a blur correction microcomputer 24 and a gyrosensor 25 for the camera main body 3.

The system controller 23A is a controller that includes, for example, a CPU, a memory and the like and controls an operation of the imaging apparatus 1A in the same manner as in the system controller 23. The system controller 23A performs control of exposure by the imaging element 21, reading of image data, and image processing to the read image data. The system controller 23A comprises a first projection converting section 31A, a composing section 32A, a second projection converting section 33A, a blur detecting section 34A, and a blur correcting section 35A.

The blur detecting section 34A detects an image moving amount that accompanies posture change of the imaging apparatus 1A on the basis of pieces of image data which are continuously acquired. For example, the blur detecting section 34A detects moving vectors from the pieces of image data which are continuously acquired by pattern matching to detect the image moving amount.

The blur correcting section 35A specifies an effective region in the image data acquired by the imaging element 21 on the basis of the detected image moving amount. The effective region indicates a region to be left as a file of the image data. The blur correcting section 35A segments an image in the effective region as image data 61.

For example, in a case where the blur correcting section 35A does not perform the correction, i.e., a case where the image moving amount is not present, the section sets the effective region in which a center of the effective region (a center of a field angle) matches an optical axis center of an optical system 11. Furthermore, the blur correcting section 35A moves the effective region in accordance with the image moving amount. Specifically, the blur correcting section 35A moves the effective region in the same direction as an image moving direction and as much as the same length as an image moving length. Consequently, the blur correcting section 35A can inhibit change that accompanies blur of a position of a subject image in the continuously acquired pieces of image data 61. Furthermore, the blur correcting section 35A accumulates and calculates the image moving amounts supplied from the blur detecting section 34A from start of the exposure, thereby recognizing a shift between the center of the field angle of each piece of image data 61 and the optical axis center of the optical system 11.

The first projection converting section 31A performs projection conversion to convert a projection system of the image data 61 read from the effective region of the imaging element 21 which is set by the blur correcting section 35A. In a case of performing projection conversion processing, the first projection converting section 31A specifies a position of the optical axis center of the optical system 11 on the image data 61, and converts the image data 61 of a central projection system into image data 62 of an equidistant projection system based on the specified optical axis center.

The composing section 32A composes pieces of image data 62 in which the projection system is converted by the first projection converting section 31A, and acquires a composed image 63. For example, the composing section 32A composes the pieces of image data 62 converted into the equidistant projection system by the first projection converting section 31A, and acquires the composed image 63 of the equidistant projection system.

The second projection converting section 33A performs projection conversion to convert the projection system of the composed image 63 composed by the composing section 32A. The second projection converting section 33A converts the projection system of the composed image 63 composed by the composing section 32A into the projection system to be recorded in the form of a file. For example, the second projection converting section 33A returns the projection system of the composed image 63 composed by the composing section 32A back to an original projection system. That is, the second projection converting section 33A returns the composed image 63 of the equidistant projection system back to the composed image of the central projection system that is the original projection system. It is to be noted that the second projection converting section 33A may convert the projection system of the composed image composed by the composing section 32A into another projection system that is not the original projection system.

The system controller 23A performs wide-angle slow shutter photographing that is image blur prevention processing by the first projection converting section 31A, the composing section 32A, and the second projection converting section 33A. In the case of performing the wide-angle slow shutter photographing, the system controller 23A recognizes a proper exposure time in which proper exposure is obtainable on the basis of the exposure result by the imaging element 21, and performs continuous photographing to acquire the pieces of image data 61 continuously for an exposure time that is shorter than the proper exposure time. The first projection converting section 31A of the system controller 23A performs the projection conversion of the projection system of the pieces of image data 61 obtained by the continuous photographing. The system controller 23A composes the pieces of image data 62 subjected to the projection conversion by the first projection converting section 31A to acquire the composed image 63. The second projection converting section 33A of the system controller 23A performs the projection conversion of the composed image 63 composed by the composing section 32A, thereby acquiring image data 65 of an optional projection system.

Figure 9:
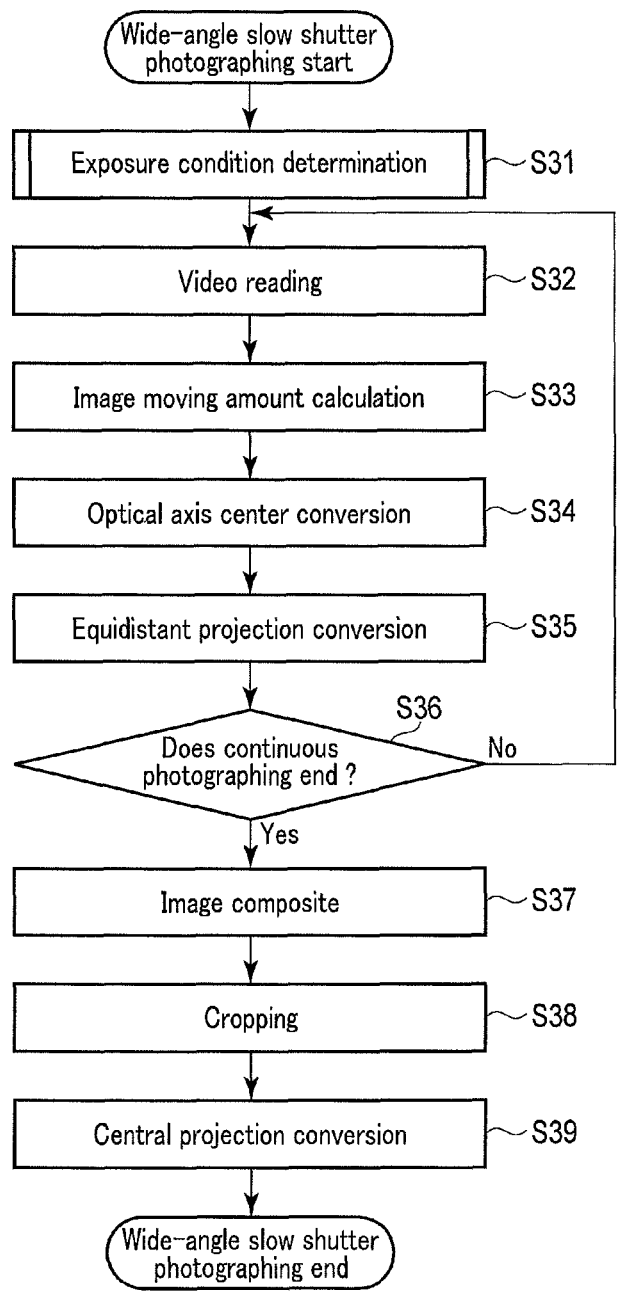
FIG. 9 is a flowchart to explain an example of an operation of the imaging apparatus according to the second embodiment.

FIG. 9 is a flowchart showing an operation of the imaging apparatus 1A that performs the wide-angle slow shutter photographing. FIG. 10 is a flowchart showing the operation of the imaging apparatus 1A that performs exposure condition determination processing.

The system controller 23A of the camera main body 3A executes the wide-angle slow shutter photographing in a case where predetermined conditions are satisfied. For example, the system controller 23A executes the wide-angle slow shutter photographing shown in FIG. 9 in a case where a focal distance of the optical system 11 is a wide angle (e.g., smaller than a predetermined focal distance). It is to be noted that FIG. 9 shows an operation concerned with the wide-angle slow shutter photographing. However, the system controller executes control concerned with camera shake correction, exposure control of the imaging element 21 and the like in parallel.

In a case of performing an operation of executing the wide-angle slow shutter photographing, the system controller 23A of the camera main body 3A executes control such as control of automatic focusing by the interchangeable lens 2 or the exposure control by the imaging element 21, thereby executing exposure by the imaging element 21. The system controller 23A determines exposure conditions such as the exposure time and the number of the images to be continuously photographed on the basis of the result of the exposure by the imaging element 21 (step S31).

When completing the exposure in the imaging element 21, the system controller 23A reads video (step S32). As described above, in a case where the optical system 11 is a lens constituted of the central projection system, the system controller 23A acquires the image data 61 of the central projection system from the imaging element 21.

The first projection converting section 31A of the system controller 23A detects the image moving amount that accompanies the posture change of the imaging apparatus 1A on the basis of the pieces of image data 61 which are continuously acquired (step S33). For example, the first projection converting section 31A detects the moving vectors from the pieces of image data which are continuously acquired by the pattern matching to detect the image moving amount.

The first projection converting section 31A of the system controller 23A performs optical axis center conversion for the image data 61 of the central projection system acquired in the step S32 on the basis of the image moving amount detected in the step S33 as described above (step S34). It is to be noted that the first projection converting section 31A may use, in the optical axis center conversion, the image moving amount detected by the blur detecting section 34A for the purpose of setting the effective region on an imaging plane. In this case, it is possible to omit the processing of the step S33.

The first projection converting section 31A of the system controller 23A performs projection conversion to convert, into the image data 62 of the equidistant projection system, the image data 61 of the central projection system which is subjected to the optical axis center conversion in the step S34 (step S35).

The system controller 23A judges whether or not the continuous photographing ends (step S36). For example, the system controller 23A judges whether or not the continuous photographing is performed as much as the number of the images to be continuously photographed which is determined in the step S31. In a case of judging that the continuous photographing does not end (the step S36, NO), the system controller 23A shifts to the processing of the step S32. Consequently, the system controller 23A repeats the processing of the steps S32 to S35 until the controller performs the continuous photographing as much as the number of the images to be continuously photographed which is determined in the step S31.

In a case of judging in the step S36 that the continuous photographing ends (the step S36, YES), the composing section 32A of the system controller 23A composes the images to acquire the composed image 63 by a method similar to that of the first embodiment (step S37).

Furthermore, the composing section 32A of the system controller 23A crops the composed image 63 (step S38).

The second projection converting section 33A of the system controller 23A converts the composed image 63 of the equidistant projection system which is cropped in the step S38 into the image data 65 of the central projection system (step S39), to end the wide-angle slow shutter photographing. That is, the second projection converting section 33A converts the composed image 63 of the equi-distant projection system into its original central projection system, so that it is possible to obtain the image data 65 of the proper exposure in the exposure time that is shorter than the proper exposure time.

The system controller 23A converts the image data 65 obtained by the above processing into an image format for recording, thereby generating an image file for recording. The system controller 23A records the image file in the recording medium 27.

Next, the exposure condition determination processing will be described with reference to FIG. 10.

First, the system controller 23A determines photo sensitivity, exposure time and aperture value of the imaging element 21 by AE control in the same manner as in the step S21 of FIG. 5 (step S41).

The system controller 23A estimates an allowable exposure time on the basis of the focal distance of the optical system 11 in the same manner as in the step S25 of FIG. 5 (step S42).

When estimating the allowable exposure time, the system controller 23A determines the number of the images to be photographed in the same manner as in the step S26 of FIG. 5 (step S43).

By the above-mentioned processing of the steps S41 to S43, the system controller 23A determines exposure conditions such as the exposure time and the number of the images to be continuously photographed.

Also according to the above-mentioned constitution, similarly to the first embodiment, the imaging apparatus 1A uses inhibition of the blur due to the continuous photographing together with inhibition of the blur due to the shift of the imaging plane, so that it is possible to decrease loads of the image composition and to improve accuracy of the image composition.

Third Embodiment

Hereinafter, an example of an imaging apparatus 1B according to a third embodiment will be described with reference to FIG. 11. It is to be noted that a constitution similar to the imaging apparatus 1 according to the first embodiment is denoted with the same reference signs, and its detailed description is omitted.

Figure 11:
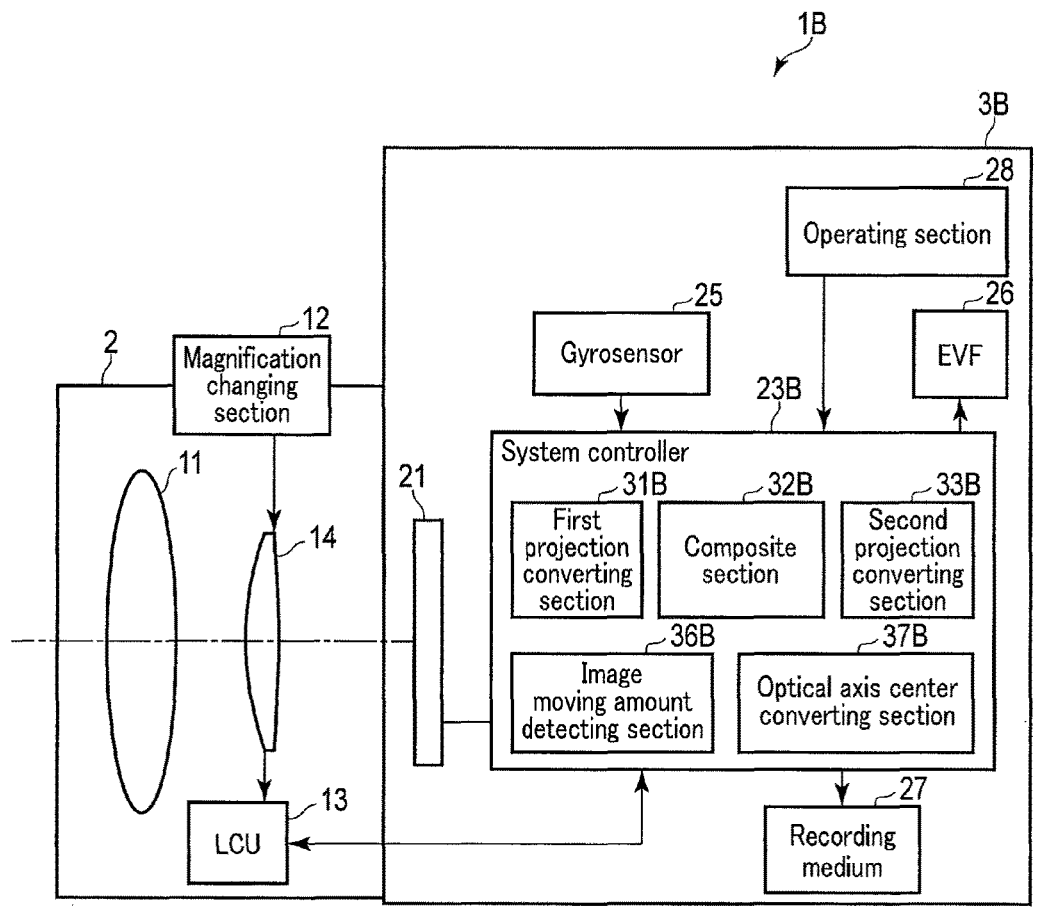
FIG. 11 is a diagram to explain a constitution example of an imaging apparatus according to a third embodiment.

FIG. 11 shows the constitution example of the imaging apparatus 1B. The imaging apparatus 1B is a lens interchangeable type camera that performs electronic blur correction. The imaging apparatus 1B comprises a lens 2 and a camera main body 3B. The camera main body 3B comprises an imaging element 21, a system controller 23B, a gyrosensor 25, an EVF 26, a recording medium 27, and an operating section 28. That is, the camera main body 3B does not comprise a blur correcting section 22 and a blur correction microcomputer 24 for the camera main body 3.

The system controller 23B is a controller that includes, for example, a CPU, a memory and the like and controls an operation of the imaging apparatus 1B in the same manner as in the system controller 23. The system controller 23B performs control of exposure by the imaging element 21, reading of image data, and image processing to the read image data. The system controller 23B comprises a first projection converting section 31B, a composing section 32B, an image moving amount detecting section 36B, and an optical axis center converting section 37B.

The image moving amount detecting section 36B detects an image moving amount of a subject image on an imaging plane of the imaging element 21 on the basis of optical characteristic information indicating an angular velocity signal supplied from the gyrosensor 25, a focal distance of an optical system 11, a projection system of the optical system 11, and the like. For example, the image moving amount detecting section 36B detects the image moving amount of the subject image in a horizontal direction on the imaging plane in accordance with an amount of a rotary motion in a yaw direction which is indicated by the angular velocity signal and in which a vertical direction of the imaging plane of the imaging element 21 is defined as an axis. Furthermore, the image moving amount detecting section 36B detects the image moving amount of the subject image in the vertical direction on the imaging plane in accordance with the amount of the rotary motion in a pitch direction which is indicated by the angular velocity signal and in which the horizontal direction of the imaging plane of the imaging element 21 is defined as an axis. Furthermore, the image moving amount detecting section 36B detects an image rotating amount of the subject image in a roll direction on the imaging plane in accordance with the amount of the rotary motion in a roll direction which is indicated by the angular velocity signal and in which an optical axis of the optical system 11 is defined as an axis.

The first projection converting section 31B performs projection conversion to convert a projection system of image data 61. The first projection converting section 31B specifies a position of an optical axis center of the optical system 11 in the image data 61 on the basis of, for example, an image moving distance, and converts the image data 61 into image data 62 of an equidistant projection system based on the specified optical axis center.

The optical axis center converting section 37B performs optical axis center conversion to move the optical axis center in the image data 62 on the basis of the image moving amount calculated by the image moving amount detecting section 36B. The image data 62 is the equidistant projection, and hence the optical axis center converting section 37B obtains a coordinate converted into angle change, from a field angle obtained from the focal distance. A method of the optical axis center conversion is similar to the method of the second embodiment.

The composing section 32B adds and composes pieces of image data 62 which are subjected to the optical axis center conversion by the optical axis center converting section 37B and in which the optical axis centers of the pieces of image data are aligned, to acquire a composed image 63. The composing section 32B segments the composed image 63 at a predetermined field angle.

A second projection converting section 33B performs projection conversion to convert a projection system of the composed image 63 composed by the composing section 32B. The second projection converting section 33B converts the projection system of the composed image 63 composed by the composing section 32B into the projection system to be recorded in the form of a file. For example, the second projection converting section 33B returns the projection system of the composed image 63 composed by the composing section 32B back to an original projection system. That is, the second projection converting section 33B returns the composed image 63 of the equidistant projection system back to the composed image of a central projection system that is the original projection system. It is to be noted that the second projection converting section 33B may convert the projection system of the composed image composed by the composing section 32B into another projection system that is not the original projection system.

According to the above-mentioned constitution, the imaging apparatus 1B performs the projection conversion by the first projection converting section 31B and the optical axis center conversion by the optical axis center converting section 37B in accordance with the image moving amount calculated on the basis of the angular velocity signal supplied from the gyrosensor 25. Consequently, for example, even in a case where a reference image has low contrast because a subject is dark or for another reason, the imaging apparatus 1B can appropriately perform the projection conversion and the optical axis center conversion.

It is to be noted that in the above-mentioned embodiment, there has been described an example of composition of the continuously photographed images for camera shake inhibition as the composition of the images in the imaging apparatus 1, but the present invention is not limited to this constitution. The present invention is applicable to any image composition as long as the imaging apparatus 1 superimposes the images obtained by photographing operations on one another to compose the image. For example, the present constitution of the imaging apparatus 1 is applicable to HDR processing of acquiring and composing the images different in exposure, multiple exposure, or the like.

Furthermore, in the above embodiment, it has been described that the system controller 23 of the imaging apparatus 1 is constituted to execute the wide-angle slow shutter photographing shown in FIG. 4 in a case where the focal distance of the optical system 11 is a wide angle (e.g., smaller than a predetermined focal distance), but the present invention is not limited to this constitution. The system controller 23 may judge whether or not to perform the wide-angle slow shutter photographing on the basis of various conditions such as whether or not setting to perform the wide-angle slow shutter photographing is present, whether or not the focal distance is smaller than a threshold value, whether or not the exposure time is not less than the threshold value, and whether or not a predicted blur amount is not less than the threshold value. Furthermore, the system controller 23 may perform the wide-angle slow shutter photographing in a case where all of these conditions are satisfied or a case where an optional condition in these conditions is satisfied.

It is to be noted that the function described in each above-mentioned embodiment is not limited to a constitution using hardware, and a program in which each function is described may be read and achieved by a computer using software. Furthermore, each function may be constituted by suitably selecting one of the software and the hardware.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An imaging apparatus comprising: an imaging element comprising an imaging plane in which pixels to convert light into electric signals are arranged;
    a photographing optical system that forms a subject image of a first projection system on the imaging plane; and,
    a processor executing instruction to implement:
    an imaging control section that acquires first projection images corresponding to the subject image by the imaging element;
    a first projection converting section that converts the first projection images into second projection images, respectively, each of which is an image of a second projection system in which a variation of a change amount of an image height on the imaging plane to a change amount of an entrance angle of the light into the photographing optical system is smaller than that of the first projection image;

a second projection converting section that converts the composed image into an image of a projection system different, from the second projection system.

2. The imaging apparatus according to claim 1, wherein the composing section performs positioning of the second projection images to perform the composition.

3. The imaging apparatus according to claim 2, wherein the processor further comprising:
an optical axis center converting section that performs optical axis center conversion to match a center of a field angle with an optical axis center of the photographing optical system to the first projection images or the second projection images on the basis of an image moving amount of the subject image.

4. The imaging apparatus according to claim 2, wherein the first projection system is a central projection system, and the second projection system is an equidistant projection system.

5. The imaging apparatus according to claim 2, wherein the second projection converting section returns the composed image back to the image of the first projection system.

6. The imaging apparatus according to claim 2, wherein the imaging control section calculates a proper exposure time to obtain the image of proper exposure along a preset reference, and acquires the first projection images in an exposure time that is shorter than the proper exposure time, and
the composing section adds and composes the second projection images.

7. The imaging apparatus according to claim 6, wherein the imaging control section calculates an allowable exposure time for which a blur amount becomes smaller than a reference, on the basis of an image moving amount of the subject image, and determines the number of the first projection images acquired by dividing the proper exposure time by the allowable exposure time.

8. The imaging apparatus according to claim 6, wherein the imaging control section calculates an allowable exposure time for which a blur amount becomes smaller than a reference, on the basis of a focal distance of the photographing optical system, and determines the number of the first projection images acquired by dividing the proper exposure time by the allowable exposure time.

9. The imaging apparatus according to claim 2, further comprising:
a blur correcting section that adjusts a positional relation between the subject image and the imaging plane on the basis of an image moving amount of the subject image.

10. The imaging apparatus according to claim 3, wherein the image moving amount is calculated on the basis of detection of an angular velocity sensor.

11. The imaging apparatus according to claim 3, wherein the image moving amount is calculated on the basis of a difference between the first projection images.

12. A control method of an imaging apparatus, the control method comprising:
providing an imaging apparatus comprising:
an imaging element comprising an imaging plane in which pixels to convert light into electric signals are arranged; and
a photographing optical system that forms a subject image of a first projection system on the imaging plane,
acquiring first projection images corresponding to the subject image by the imaging element;
converting the first projection images into second projection images, respectively, each of which is an image of a second projection system in which a variation of a change amount of an image height on the imaging plane to a change amount of an entrance angle of the light into the photographing optical system is smaller than that of the first projection image;
composing the second projection images to acquire a composed image; and
converting the composed image into an image of a projection system different from the second projection system.

13. The control method of the imaging apparatus according to claim 12, further comprising:
performing positioning of the second projection images to perform the composition.

14. The control method of the imaging apparatus according to claim 13, further comprising:
performing optical axis center conversion to match a center of a field angle with an optical axis center of the photographing optical system to the first projection images or the second projection images on the basis of an image moving amount of the subject image.

15. The control method of the imaging apparatus according to claim 13,
wherein the first projection system is a central projection system, and the second projection system is an equidistant projection system.

16. The control method of the imaging apparatus according to claim 13, further comprising:
returning the composed image back to the image of the first projection system that is an original projection system.

17. The control method of the imaging apparatus according to claim 13, further comprising:
calculating a proper exposure time to obtain the image of proper exposure along a preset reference, acquiring the first projection images in an exposure time that is shorter than the proper exposure time, converting the acquired first projection images into the second projection images, respectively, and adding and composing the second projection images.

18. The control method of the imaging apparatus according to claim 17, further comprising:
calculating an allowable exposure time for which a blur amount becomes smaller than a reference, on the basis of an image moving amount of the subject image, and determining the number of the first projection images acquired by dividing the proper exposure time by the allowable exposure time.

19. The control method of the imaging apparatus according to claim 17, further comprising:
calculating an allowable exposure time for which a blur amount becomes smaller than a reference, on the basis of a focal distance of the photographing optical system, and determining the number of the first projection images acquired by dividing the proper exposure time by the allowable exposure time.

20. The control method of the imaging apparatus according to claim 13, further comprising:
adjusting a positional relation between the subject image and the imaging plane on the basis of an image moving amount of the subject image to perform image blur correction.

* * * * *